United States Patent [19]

Azuma et al.

[11] Patent Number: 5,350,269
[45] Date of Patent: Sep. 27, 1994

[54] WORK PICK-UP APPARATUS

[75] Inventors: Yusaku Azuma, Yokohama; Katsumi Ishihara, Tokyo; Masaru Shibata, Kawasaki, all of Japan

[73] Assignee: Canon Kabushiki Kaisha, Tokyo, Japan

[21] Appl. No.: 820,808

[22] Filed: Jan. 15, 1992

Related U.S. Application Data

[63] Continuation of Ser. No. 499,730, Mar. 27, 1990, abandoned.

[30] Foreign Application Priority Data

Mar. 27, 1989 [JP] Japan .................................. 1-71895
Mar. 8, 1990 [JP] Japan .................................. 2-55032

[51] Int. Cl.$^5$ ...................... B65B 69/00; B25J 19/04; G01B 11/03
[52] U.S. Cl. ...................... 414/416; 901/47; 356/375; 395/162
[58] Field of Search .............. 414/403, 416; 901/16, 901/47; 356/375; 364/478; 395/162

[56] References Cited

U.S. PATENT DOCUMENTS

| | | | |
|---|---|---|---|
| 4,187,051 | 2/1980 | Kirssch et al. | 901/47 X |
| 4,389,677 | 6/1983 | Rushby et al. | |
| 4,435,837 | 3/1984 | Abernathy | 901/47 X |
| 4,575,304 | 3/1986 | Nakagawa et al. | 901/47 X |
| 4,633,326 | 12/1986 | Endoh et al. | |
| 4,651,203 | 3/1987 | Peterson | 901/47 X |
| 4,704,694 | 11/1987 | Czerniejewski | 901/47 X |
| 4,707,647 | 11/1987 | Coldren et al. | 364/478 X |
| 4,712,970 | 12/1987 | Nakamura et al. | 901/47 X |
| 4,737,845 | 4/1988 | Susuki et al. | 901/47 X |
| 4,738,025 | 4/1988 | Arnold | 901/47 X |
| 4,744,039 | 5/1988 | Suzuki et al. | 901/47 X |
| 4,899,095 | 2/1990 | Kishi et al. | 901/47 X |
| 4,980,971 | 1/1991 | Bartschat et al. | 901/47 X |

FOREIGN PATENT DOCUMENTS

| | | |
|---|---|---|
| 2102240 | 1/1983 | European Pat. Off. |
| 20255949 | 2/1988 | European Pat. Off. |
| 60-56884 | 4/1985 | Japan |
| 60-123974 | 7/1985 | Japan |
| 62-140724 | 6/1987 | Japan |
| 2161042 | 3/1985 | United Kingdom |

OTHER PUBLICATIONS

Page et al, Visually Interactive Gripping of Engineering Parts from Random Orientation, from Digital Systems for Industrial Automatic vol. 1, No. 1, 1981, pp. 11–42.

Hollingum, Robots That See, Feel & Sense, from the Engineer, Nov. 20, 1980 pp. 45 & 48.

"Digital Halftoning of Images" by D. Anastassiou et al. IBM Journal of Research and Development, vol. 26, No. 6, pp. 687–697 Nov. 1982.

Primary Examiner—Michael S. Huppert
Assistant Examiner—Stephen Gordon
Attorney, Agent, or Firm—Fitzpatrick, Cella, Harper & Scinto

[57] ABSTRACT

A work pick-up apparatus which picks up an object work out of a plurality of works held on a container case through visual recognition of the position of the object work by a visual sensor. The apparatus comprises: a memory circuit for storing shape characteristic information concerning the shape characteristic of the object work; an input circuit for externally inputting approximate position information representing an approximate position of the object work on the case, the approximate position information being expressed in terms of a coordinate system associated with the work pick-up apparatus; and a measuring circuit for measuring the pick-up position of the work in terms of the coordinate system associated with the pick-up apparatus, by processing the image information concerning the work obtained through the visual sensor in accordance with the approximate position information and the shape characteristic information.

8 Claims, 15 Drawing Sheets

| No. | POSITION DATA | | | |
|---|---|---|---|---|
| | X | Y | Z | 0 |
| 1 | 300 | 200 | 0 | 0 |
| 2 | 300 | 200 | 50 | 0 |
| 3 | 310 | 200 | 0 | 0 |
| 4 | 310 | 200 | 50 | 0 |
| 5 | | | | |

FIG. 8

OPERATION INSTRUCTION

| STEP 1 | VREAD (1,1) | READ (1,1) |
|---|---|---|
| 2 | VMOVE (1,1) | MOVE TO (1,1) |
| 3 | VMOVE (1,2) | MOVE TO (1,2) |
| 4 | ON 1 | VACUUM ON |
| 5 | VMOVE (1,1) | MOVE TO (1,1) |
| 6 | | |

FIG. 9

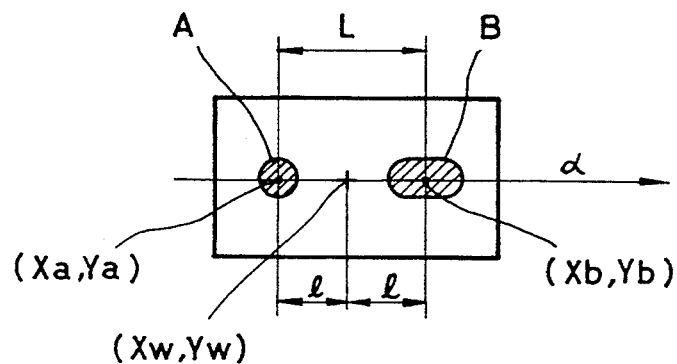
F I G. 10
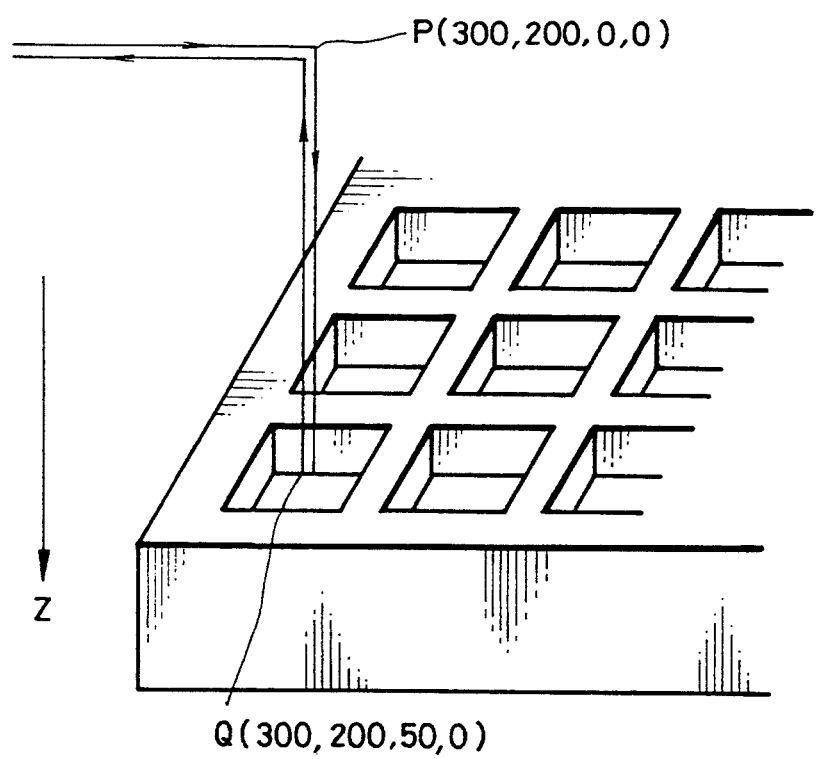
F I G. 11

PROCESSABLE AREA PA(x,y)

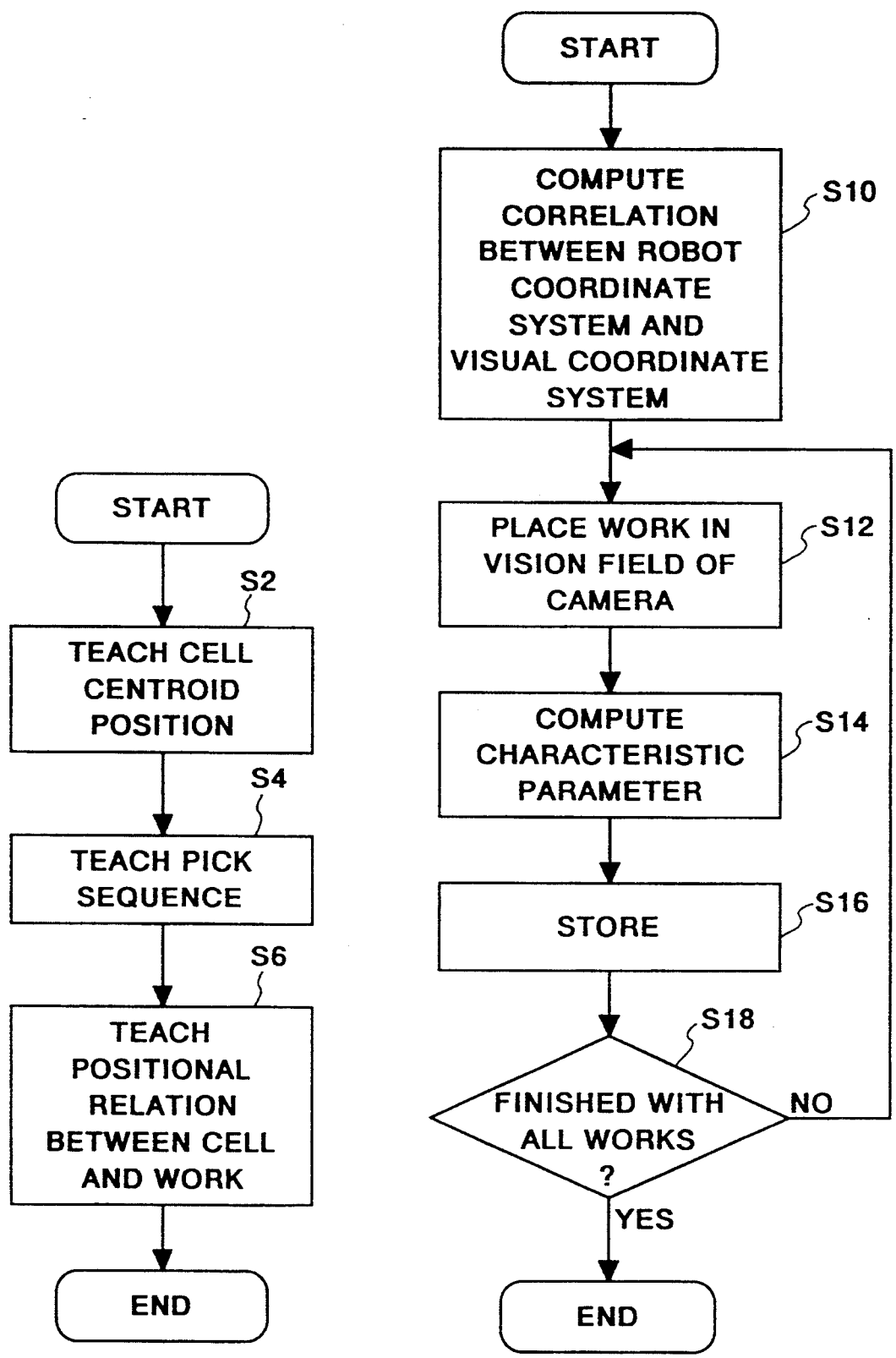
F I G. 17A    F I G. 17B

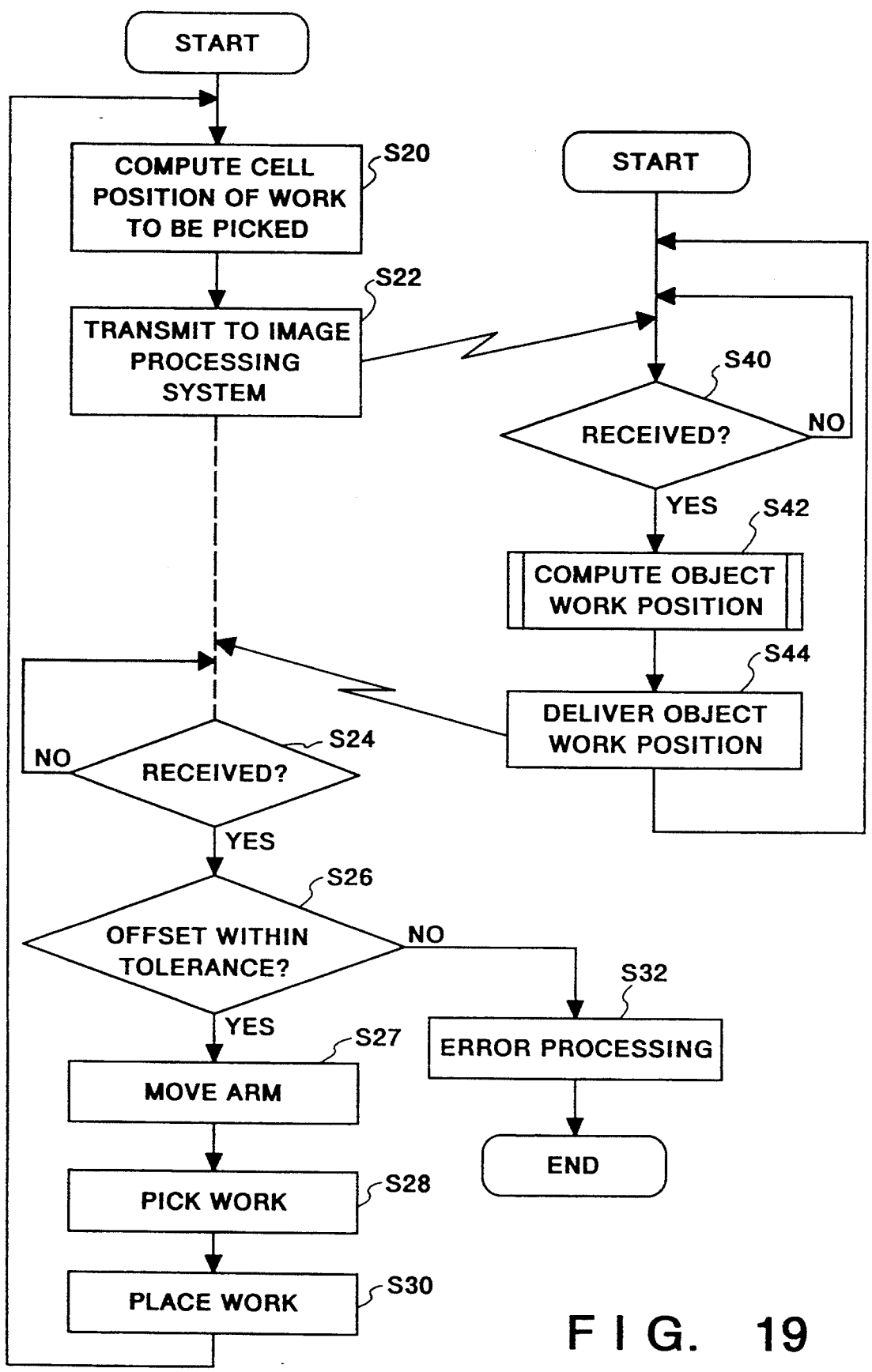
F I G. 19

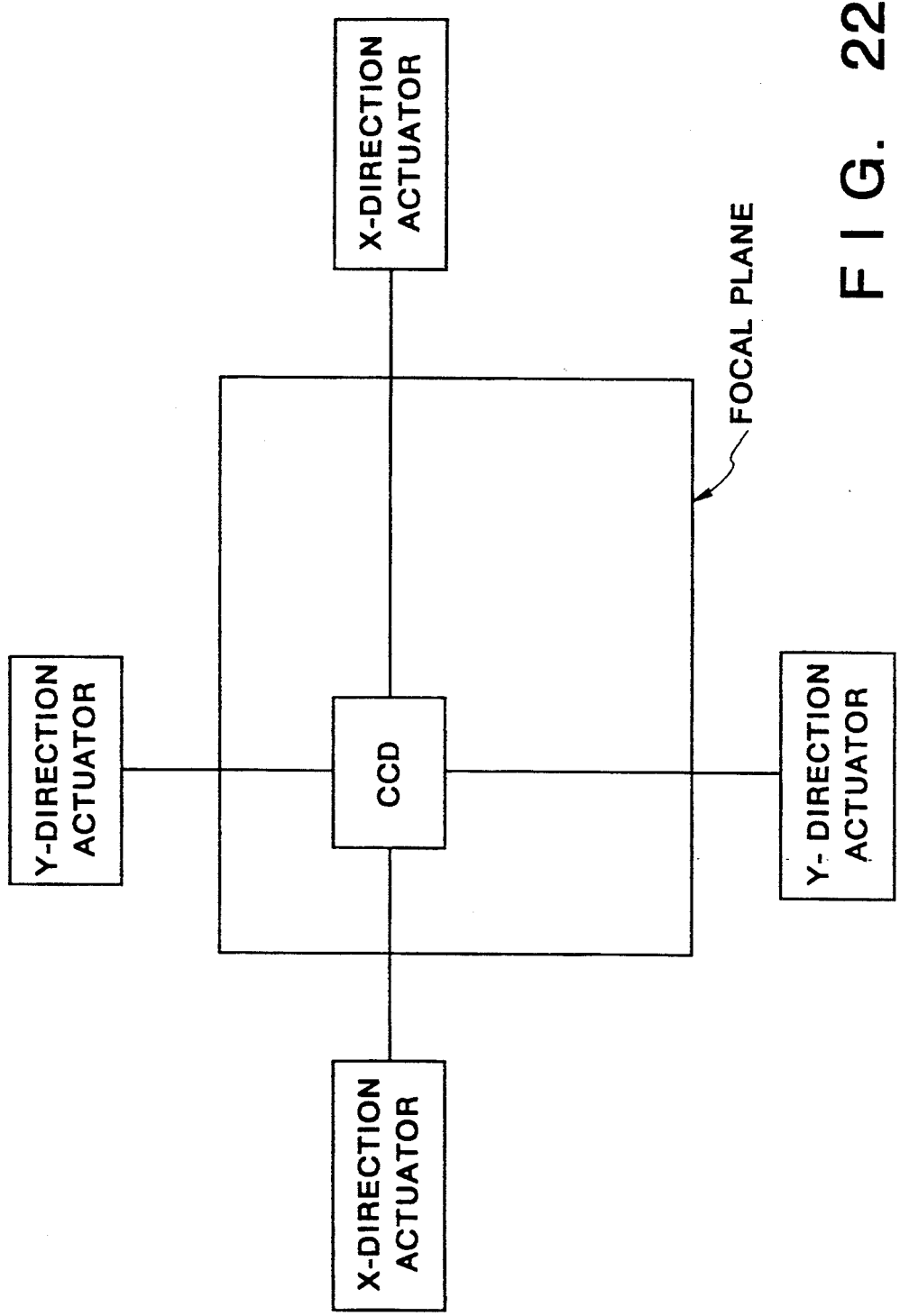

WORK PICK-UP APPARATUS

This application is a continuation of application Ser. No. 07/499,730, filed Mar. 27, 1990, now abandoned.

BACKGROUND OF THE INVENTION

The present invention relates to a work pick-up apparatus incorporating a visual sensor such as an ITV camera and capable of controlling an operation for picking up a work in accordance with work position information concerning the position of the work derived from the visual sensor. More particularly, the present invention is concerned with a work pick-up control apparatus which conducts a control such that a specific work is picked up out of a plurality of works stored in a magazine, a pallet or a similar container (referred to simply as "pallet" hereinafter).

In a known automatic assembly system incorporating a robot for handling a plurality of parts or works, a pallet is provided with guide surfaces conforming with the configurations of the works so that the works are set with high positional accuracy, and the works are arranged on the pallet in the form of a matrix to enable the robot to store data concerning the positions of the works. The assembly system picks up a selected work out of the pallet and mounts the same on a predetermined portion of an object which is being assembled.

Referring to FIG. 2A, a work 1 as an example of works handled by a known assembly system is provided with guide holes 1a and 1b. Numeral 1c denotes the gravity center of the work. FIG. 2B shows a plurality of works 1 arranged on a pallet 2. Although not exclusive, the pallet 2 is provided with recesses arranged in the form of a matrix having four lines and four columns so as to receive 4×4 works. Each of the recess is provided with guide pins 2a, 2b projecting upward from the bottom thereof. Each work 1 can be precisely fixed in each recess by virtue of mutual engagement between these guide pins 2a, 2b and the guide holes 1a, 1b formed in the work 1. FIG. 2C is a sectional view taken along the line X—X of FIG. 2B, showing two of such works 1 fixed in the respective recesses by means of the pins 2a, 2b. Hitherto, it has been necessary to locate the pallet 2 with respect to the robot at a high precision by, for example, clamping the pallet 2.

FIG. 3 shows the relationship between the work position and the robot coordinate. In general, the works are arranged on the pallet at constant pitches both in longitudinal and transverse directions, e.g., at a pitch a in X-direction and at a pitch b in Y-direction. The robot stores coordinate data of all points or coordinates of three corner points, e.g., points 3, 4 and 5 shown in FIG. 3, and computes the coordinates of an aimed point so as to move to a position where it can pick up the object work.

The described system incorporating a pallet has the following problems. The pallet is required to have high precision in order to enable the robot to pick up the object work without fail. Such a precise pallet is expensive. In addition, it is necessary to employ suitable means or device capable of locating the pallet with respect to the robot at a high precision. For these reasons, the cost of the whole assembly system is raised uneconomically.

In recent years, a system has been proposed as in, for example, Japanese Patent Application Laid-Open Nos. 60-56884, 60-123974 and 62-147024, in which a robot operates in accordance with position data obtained through an image processing operation conducted on outputs from a visual sensor.

According to Japanese Patent Application Laid-Open No. 62-147024, a parts feeder feeds parts one by one into the field of vision of a camera used as a visual sensor to enable the camera recognize the positions of these parts so that pick-up of the part is conducted in accordance with the data derived from the camera. It is true that this system employing a visual sensor enables a high accuracy of gripping of parts.

In the arts shown in Japanese Patent Application Laid-Open Nos. 60-56884 and 60-123974, an image is formed with a plurality of works positioned in the field of vision, and an approximate position of an object work is determined from this image, followed by recognition of the exact pick-up position from an enlarged image which is formed to cover an area around the object work.

Unfortunately, however, the system of 62-147024 cannot be applied to the field to which the present invention pertains, i.e., the field in which a specific part has to be picked up out of a plurality of parts arranged on a pallet, since this known system requires that parts are brought into the field of vision of a camera. Namely, when the known system is applied to gripping of a selected one of a plurality of works on a pallet, a plurality of works may be simultaneously taken into the image pick-up area of the visual sensor, depending on the size of the works. In such a case, it is difficult to determine which one of the recognized works has to be picked up.

The arts shown in Japanese Patent Application Laid-Open Nos. 60-56884 and 60-123974 require a preliminary step in which the visual system recognizes the rough positions of independent works from the image which contains the images of a plurality of works. This preliminary operation is time-consuming and causes an impediment to improvement in the processing speed of the whole system.

SUMMARY OF THE INVENTION

The present invention is aimed at overcoming the above-described problems of the prior arts.

Accordingly, an object of the present invention is to provide a work pick-up apparatus which can correctly pick up a desired work out of a plurality of works which are received in a case, or pallet.

Another object of the present invention is to provide a work pick-up apparatus which relieves an operator from a task for correctly recognizing the position of a work to be picked up.

Still another object of the present invention is to provide a work pick-up apparatus in which the position where an object work is to be picked up is converted into a coordinate system set on a visual sensor, followed by an operation conducted to search for an image having shape characteristic similar to the shape of the object work, and the position of the centroid of the searched image is determined as the correct pick-up position.

A further object of the present invention is to provide a work pick-up apparatus of the type mentioned above, wherein the visual sensor having a sensing area which substantially covers the entire area of the case receiving the works, and wherein the searching region in which the image having shape characteristics similar to the object work is searched has a size substantially the same as that of each of a plurality of work-receiving unit regions provided in the case.

A still further object of the present invention is to provide a work pick-up apparatus of the type mentioned above, wherein the visual sensor has a sensing area which covers a region of a size substantially the same as that of each of a plurality of work-receiving unit regions provided in the case.

A still further object of the present invention is to provide a work pick-up apparatus, wherein a control section for controlling the work assembling operation and an image processing section for determining the correct position of the work are constructed as independent units which communicate with each other through communication means.

A still further object of the present invention is to provide a work pick-up apparatus which can conduct an error operation when the measured coordinate position of the object work largely differs from the instructed position of the work.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the 0 invention, and therefore reference is made to the claims which follow the description for determining the scope of the invention.

BRIEF DESCRIPTION OF THE DRAWINGS

FIG. 8 is a table showing approximate coordinate values of pick-up positions of works;

FIG. 9 is an illustration of an application program used in the apparatus shown in FIG. 1;

FIG. 10 is an illustration of characteristics of a work 5 to be handled by the apparatus shown in FIG. 1;

FIG. 11 is an illustration of a path of a robot hand along which the hand moves to pick-up a work;

FIGS. 17A and 17B are flow charts showing operations of the robot control system and the image processing system conducted as a preparatory process for an assembly operation;

FIG. 19 is a flow chart showing a process for controlling assembly of an object with the work;

FIG. 22 is an illustration of a sensor moving mechanism in a modification of the illustrated embodiment.

DESCRIPTION OF THE PREFERRED EMBODIMENTS

An embodiment of the work pick-up apparatus of the present invention, applied to an automatic assembly system, will be described hereinunder.

Figure 1:
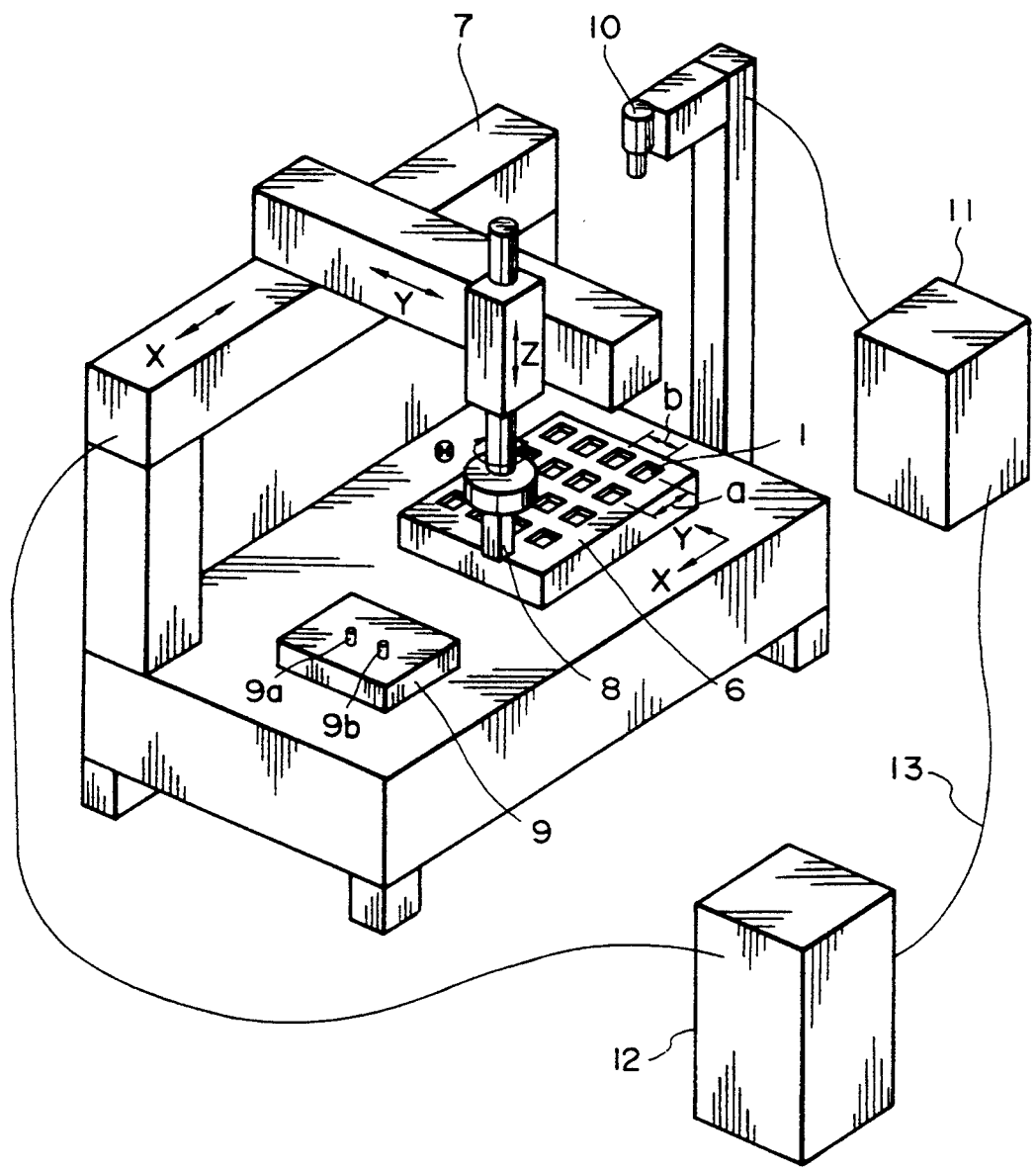
FIG. 1 is a perspective view of an assembly robot system to which the present invention is applied.
Figure 2A:
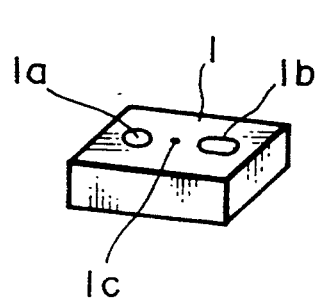
FIG. 2A is a perspective view of a work which can be handled both by an apparatus embodying the invention and an apparatus of prior arts.
Figure 2B:
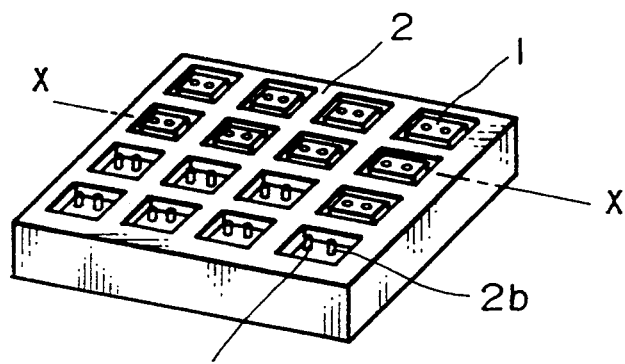
FIG. 2B is a perspective view of a pallet receiving a plurality of works of the type shown in FIG. 2A.
Figure 2C:
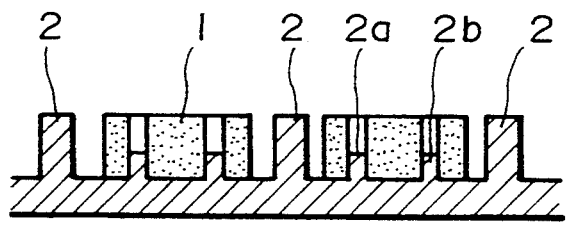
FIG. 2C is a sectional view taken along the line X—X of FIG. 2B.
Figure 3:
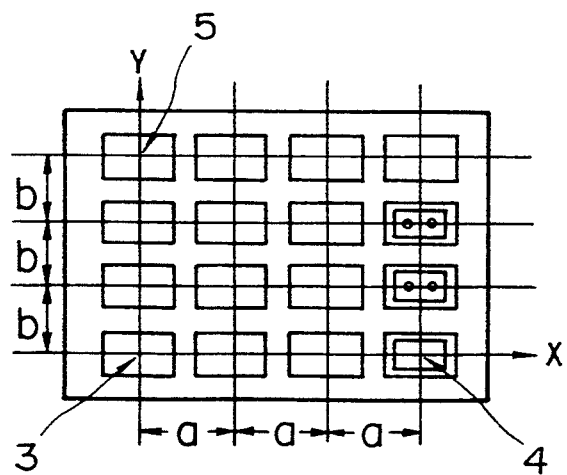
FIG. 3 is an illustration explanatory of the necessity for high precision of a pallet in the apparatus of the prior arts.
Figure 4A:
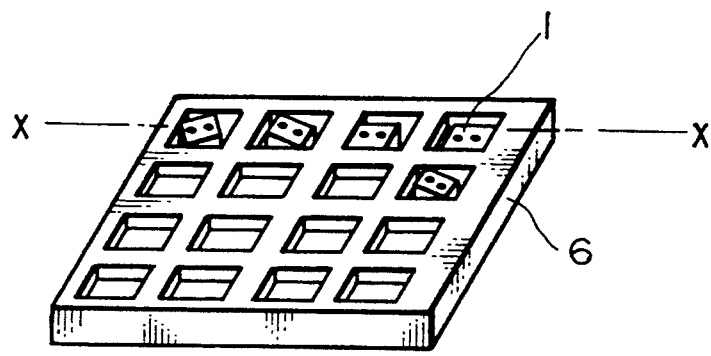
FIG. 4A is a perspective view of a pallet receiving works.
Figure 4B:
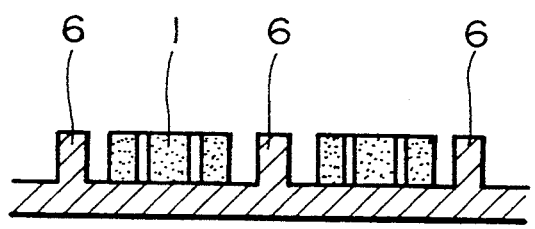
FIG. 4B is a sectional view taken along the line X—X of FIG. 4A.
Figure 13:
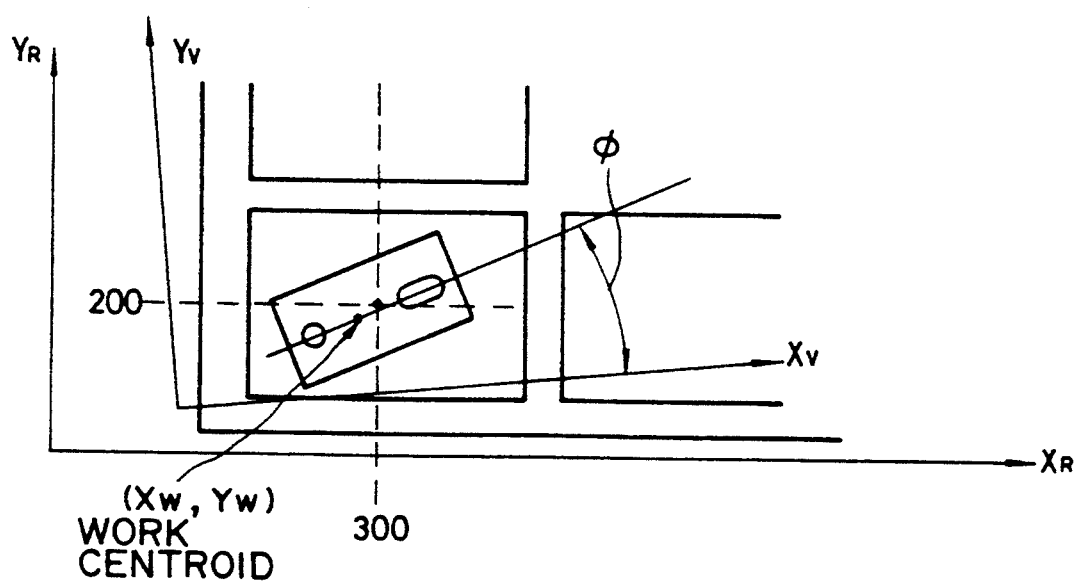
FIG. 13 is an illustration of the position of a selected work on the pallet both in the robot coordinate system and a visual sensor coordinate system.

FIG. 4A is a perspective view of a pallet 6 having a plurality of recesses (referred to as "cells" hereinafter) for receiving works 1, while FIG. 4B is a sectional view taken along the line X—X of FIG. 4A. The work 1 shown in FIG. 4A is the same as that shown in FIG. 1 illustrating a known apparatus. In this embodiment, locating means such as the pins used for precisely locating each work in the known apparatus are eliminated because it is not necessary to fix these works 1 in the cell. It will be seen that the works 1 are oriented in various directions within the associated cells because of certain degree of "play" given to the works with respect to the walls of the cells. As shown in FIG. 13, however, two holes A and B formed in the work are used as shapes or marks indicative of whether the work is the very one which is to be picked up. The manner in which these holes A and B are used as the shapes or marks will be described later.

FIG. 1 is a perspective view of the whole of an assembly system incorporating a robot to which the present invention is applied. The robot, denoted by 7, is an orthogonal-type robot having four degrees of freedom. More 15 specifically, the robot 7 has two degrees of freedom in a horizontal plane defined by an X-axis and a Y-axis, one degree of freedom along a Z-axis which is on the Y-axis and one degree of freedom for rotation Θ about the Z-axis. A plurality of works 1 are set in the pallet 6 in a manner shown in FIG. 4A, and the pallet 6 is located by a pallet locating member (not shown) within the reach of the robot. The robot 7 has a hand 8 which has a vacuum sucking means evacuated through a vacuum conduit (not shown) so as to pick-up one of the works 1 and conveys the same to an assembly stage 9. Locating pins 9a and 9b are provided on the assembly stage 9 where the robot places the work to assemble a product. In this embodiment, the camera 10 is an ITV camera having a CCD. Since this ITV camera 10 has a wide angle of field, it can take the image of the whole area on the pallet 6 at once. The CCD sensor used in this embodiment has a region containing 400,000 pixels. Numeral 11 denotes an image processing unit for processing image signals derived from the camera 10. The operation of this unit 11 will be described later. A robot control system 12 is capable of locating the hand 8 with four degrees of freedom mentioned above, i.e., in X, Y, Z and Θ. The image processing system 11 and the robot control system 12 are connected to each other through a communication line 13.

In the assembly system of this embodiment, the robot control system 12 beforehand stores rough position information concerning positions of the independent works 1 which are arranged in a matrix-like pattern on the pallet 6. When the robot has started the assembly operation, the robot control system 12 supplies, through the communication line 13, the image processing system 11 with the approximate position information concerning the position of the work to be picked up next with respect to the pallet. The image processing system 11 then determines the exact position of the work which is closest to the position indicated by the approximate position information given by the robot control system 12. The image processing system 11 then transmits the result of the determination through the communication line 13 so that the robot control system 12 operates to bring the hand 8 to the exact work position to enable the hand to safely and correctly pick up the objective work.

Figure 5:
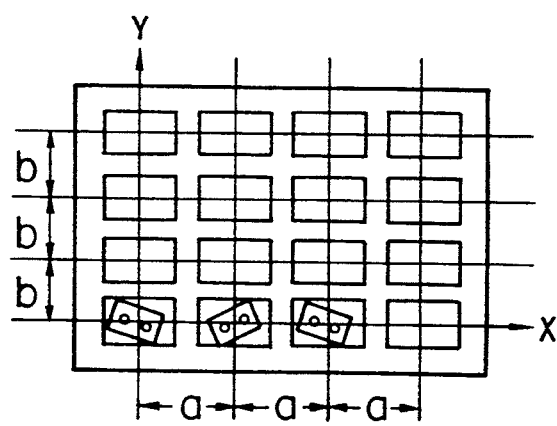
FIG. 5 is an illustration explanatory of the necessity for high precision of a pallet in the embodiment of the present invention.

FIG. 5 shows the relationship between a robot coordinate system XR, YR and the pallet 6. Approximate positions of centers of the cells in the pallet 6 have been taught to the robot control system 12. It is not necessary that the taught positions coincide with the actual positions of the cells in the pallet. In other words, it is not necessary that the pallet 6 is located absolutely exactly with respect to the system shown in FIG. 1. Practically, a deviation of the pallet 6 in an amount half the size of the work is permissible, because exact work positions with respect to the coordinate system of the robot control system 12 are taught to it through an image processing operation of the system 11 which will be described later.

Figure 6:
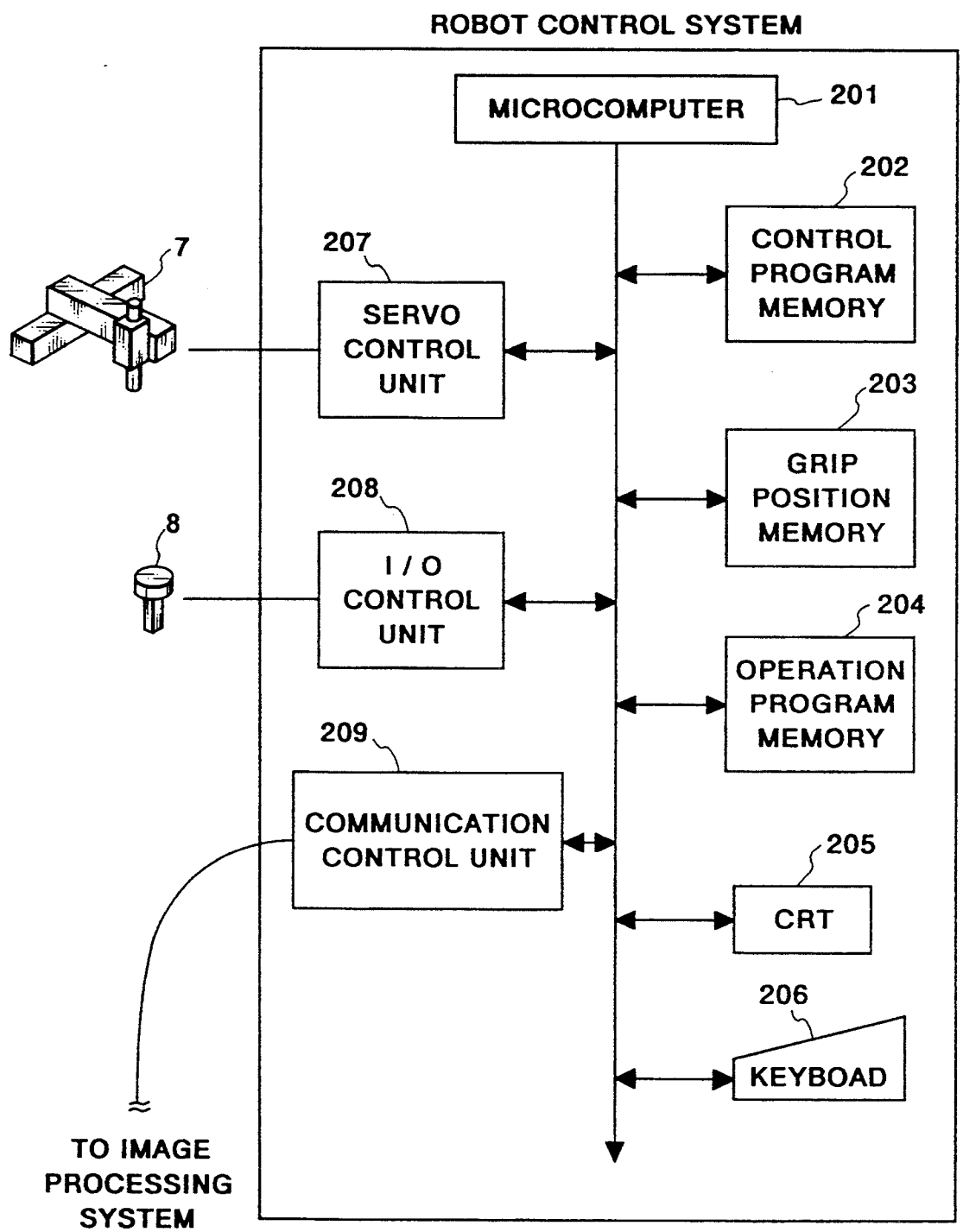
FIG. 6 is a block diagram of a control system associated with the robot.
Figure 7:
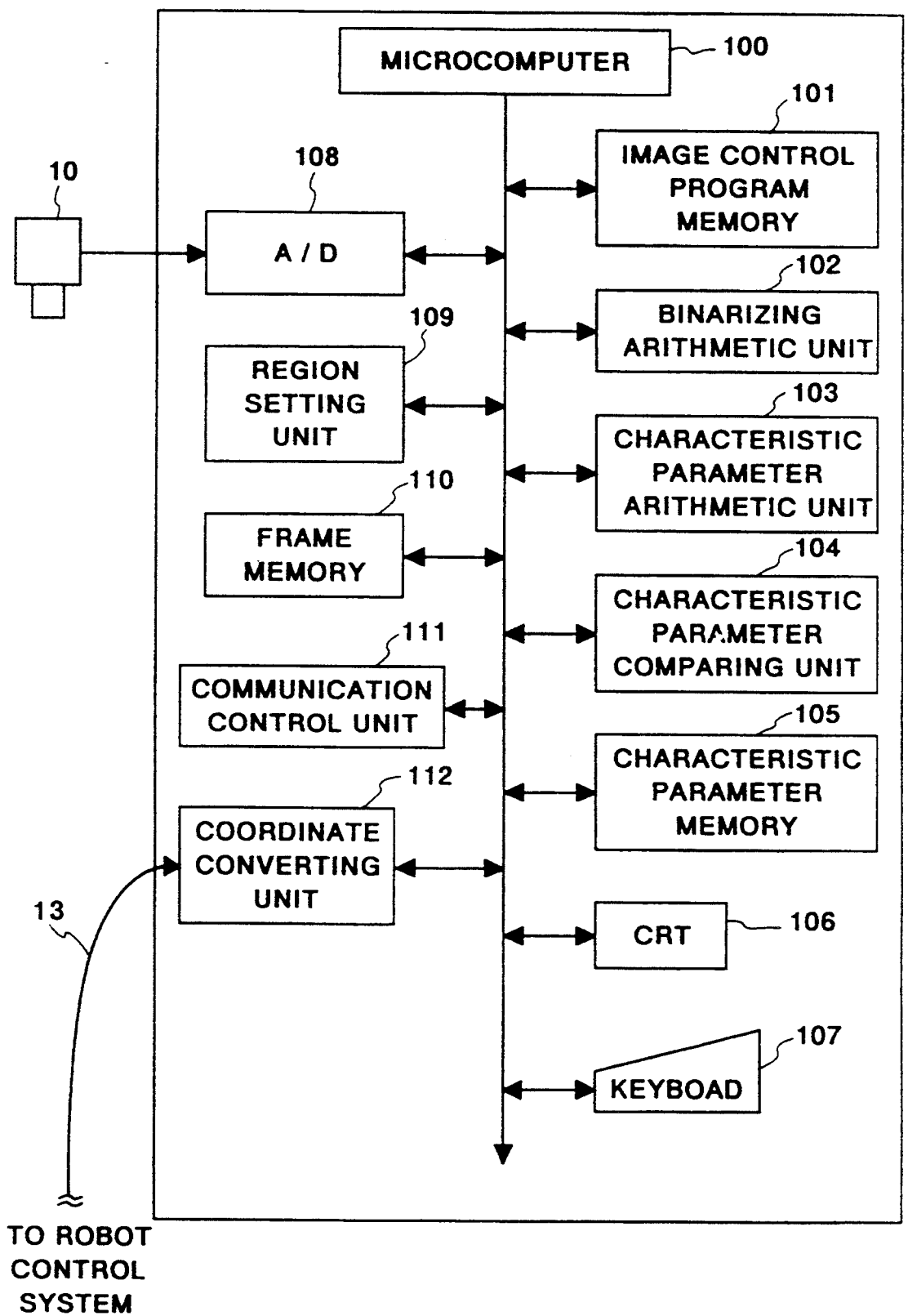
FIG. 7 is a block diagram of a control system associated with an image processing section.

FIG. 6 is a block diagram showing the circuit in the robot control system 12, while FIG. 7 is a block diagram showing the circuit in the image processing system 11.

Referring to FIG. 6, the operation of the robot arm with four degrees of freedom X, Y, Z and Θ is controlled by a servo control unit 207, while the operation of the hand 8 for picking up a work by vacuum suction is managed by an I/O control unit 208. The servo control unit 207 and the I/O control unit 208 are under the control of a microcomputer 201. The microcomputer 201 also controls various other units or components of the system: namely, a control program memory 202 for storing control programs for operating system and so forth; a position memory 203 for storing data concerning approximate positions of the works, i.e., the positions of centers of the cells; an operation program memory 204 for describing pick-up/assembly operation of the robot; a CRT 205 for displaying the state of the system, program input to the system and so forth; a keyboard 206 through which a selected program is input; and a communication control unit 209 for enabling transmission of approximate work positions to the image processing unit 11, as well as transmission of the exact work position measured by the image processing system 11.

Referring to FIG. 7, a camera 10 for taking images of the pallet and the works placed thereon is connected to the microcomputer 100 through an A/D converter 108. As explained before, the camera 10 has a CCD visual sensor with 400,000 pixels. What area of the whole area covered by the 400,000 pixels is to be stored is determined by a region setting unit 109. Namely, the region setting unit 109 sets an area of a predetermined size around the approximate work position, i.e., the center of one of the cells in the pallet. A detailed description will be given of this area with reference to FIG. 15. As a result of the area setting operation performed by the region setting unit 109, at least one cell and a work in this cell are contained in the image stored in the frame memory 110.

The microcomputer 100 also controls various other circuits shown in FIG. 7. For instance, a communication control unit 111 communicates with the communication control unit 209 of the robot control system of FIG. 6 under a control of the microcomputer 100. A coordinate converting unit 112 conducts conversion of the position of the centroid of the work to be picked up from the robot coordinate system to the visual coordinate system, and vice versa. The program memory 101 stores programs of control processes shown in FIGS. 18 and 19. A binarizing arithmetic unit 102 converts multilevel images in the frame memory 110 into a binary image. A characteristic parameter arithmetic unit 103 computes parameters characterizing the image, e.g., area of the image, position of the centroid, and so forth. If the parameters computed by the arithmetic unit 103 are of a known work, the parameters computed with this work are stored in a parameter memory 105. A characteristic comparing unit 104 compares the characteristic parameters extracted from the image taken by the camera 10 with the parameters of the known work stored in the parameter memory 105. A CRT 106 is capable of displaying the state of the system and the input program. Input of the program is conducted through the keyboard 107.

As explained before, in the robot system shown in FIG. 1, the robot control system 12 informs the image processing system 11 of the approximate position of the object work, i.e., the position of the center of the cell, before the arm is driven. Upon receipt of this information, the image processing system 11 recognizes the exact position of the work near the informed approximate position, and informs this exact position to the robot control system 12. The robot control system 12 then operates the arm in accordance with this information indicative of the exact position.

The following conditions are to be satisfied to enable the above-described control of the robot.

(1) The operation program stored in the program memory 204 of the robot control system 12 preferably describes a sequential process in which the approximate work position is informed to the image processing system 11 and then the exact work position is taught by the image processing system 11.

(2) In general, there is misalignment of axes between the robot coordinate system and the sensor coordinate system. Therefore, the approximate work position has to be converted into values on the image sensor coordinate system and the exact work position computed by the image processing system 11 has to be converted into values on the robot coordinate system.

(3) A pattern recognition process has to be executed to enable recognition of the image of the work from the image taken by the sensor 10. In this embodiment, characteristic parameters of a known work have been stored in the memory 105 and the discrimination of the work is conducted through examination of matching between the stored parameters and the characteristic parameters computed in the image taken by the camera 10.

Robot program

FIG. 9 shows an example of the root program stored in the memory 204. In Step 1, the first "1" appearing in VREAD (1,1) is a number indicating a position data set. FIG. 8 shows an example of the No. 1 position data set. The second "1" appearing in (1,1) represents the number of a position data in the position data set shown in FIG. 8.

Figure 12:
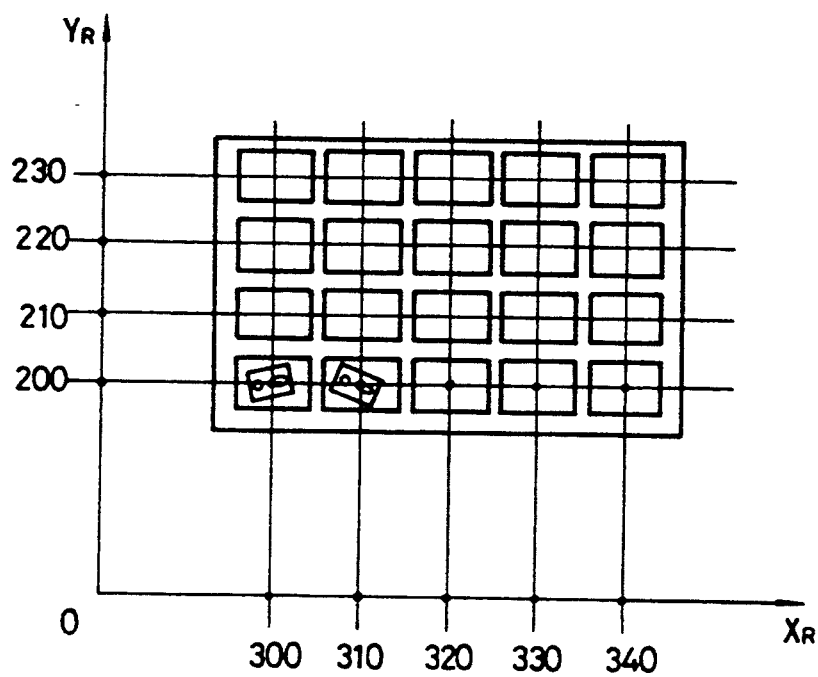
FIG. 12 is an illustration of the relationship of the position of a pallet with reference to the robot coordinate.

This position data indicates the position of the center of the cell, i.e., the approximate position of the work. Needless to say, the position data is described in terms of coordinate values of the robot coordinate system. FIG. 12 shows, in terms of the coordinate values of the robot coordinate system, the plan view of the pallet and the works on the pallet, corresponding to the data set shown in FIG. 8.

According to the program shown in FIG. 9, the instruction given in Step 1 is to cause the image processing system 11 to take the image appointed by (300, 200, 0, 0) which is the first position data of the first data set shown in FIG. 8 and to cause the image processing system 11 to send the exact work position back to the robot control system 12.

Subsequently, the robot control system 12 executes the instruction VMOVE (1, 1) given in Step 2, i.e., moves the arm to the position (1, 1). In this operation, the control program 202 interprets the instruction VMOVE as an order for moving the hand 8 to the work position obtained through the image processing system 11. Namely, the control program 202 instructs the servo control unit 207 to move the arm to the exact work position sent back from the image processing system 11 in Step 1, rather than to the position (300, 200, 0, 0) corresponding to the data (1, 1). Consequently, the hand 8 is moved to a position P shown in FIG. 11, i.e., to a position immediately above the object work.

Step 3 executes VMOVE (1, 2) so that the hand 8 may move to the position (300, 200, 50, 0) which is the second position of the first data set, i.e., down to a point Q shown in FIG. 11. In this embodiment, the downward movement along the Z-axis is expressed as being a positive movement.

In Step 4, ON 1 is executed to enable the I/O control unit 208 to operate the vacuum suction means on the hand 8 thereby picking up the work.

Coordinate Conversion

In general, it is difficult to always keep the robot coordinate system and the sensor coordinate system in alignment with each other, although not impossible. Any deviation between these two coordinate systems does not cause any problem within the image processing system 11, because the image processing system 11 recognizes the work position through pattern recognition regardless of the position of the work with respect to the cell. However, the image processing system 11 recognizes the work position in terms of the coordinate values of the sensor coordinate system, while the actual movement of the arm of the robot is conducted in accordance with the coordinate values on the robot coordinate system. In order to enable safe and correct pickup of the object work, therefore, it is necessary to know the deviation between these two coordinate systems, if any. In other words, the robot system shown in FIG. 1 should be fabricated such that the robot coordinate system and the sensor coordinate system are always held in alignment with each other or, as an alternative measure, the deviation is accepted and measured in advance to enable conversion from one to the other of these two coordinate systems. Which measures are to be taken should be determined in consideration of various factors such as the balance between the cost and the performance. In the first embodiment shown in FIG. 1, the deviation is measured in advance and a coordinate conversion is conducted as required in accordance with the measured deviation.

Figure 14:
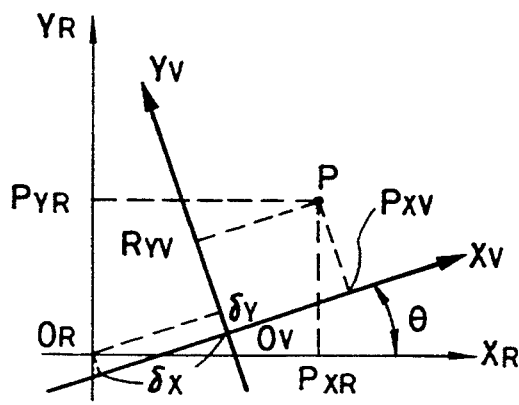
FIG. 14 is an illustration of a positional relationship between the robot coordinate system and the visual sensor coordinate system.

FIG. 14 shows the relationship between the robot coordinate system ($X_R$, $Y_R$) and the visual coordinate system ($X_V$, $Y_V$). It is assumed here that no deviation exists between these two coordinate systems in the direction of the Z-axis, for the purpose of simplification of explanation.

Referring to FIG. 14, the approximate work position, i.e., the position of the cell center, in terms of the robot coordinate system is expressed by ($P_{XR}$, $P_{YR}$, 1), while the same approximate work position on the visual coordinate system is expressed by ($P_{XV}$, $P_{YV}$, 1). It is also assumed that both coordinate systems have origins $O_V$ located at the same point ($\delta_X$, $\delta_Y$), and that the robot coordinate system ($X_R$, $Y_R$) has been rotated through an angle $\theta$ relative to the visual coordinate system. When the visual system has a resolution of k mm/pixel, the conversion of the robot coordinate system to the visual coordinate system is conducted by using the following equation:

$$\begin{bmatrix} P_{XV} \\ P_{YV} \\ 1 \end{bmatrix} = \begin{bmatrix} \cos\theta/k & -\sin\theta/k & -\delta_X \\ \sin\theta/k & \cos\theta/k & \delta_Y \\ 0 & 0 & 1 \end{bmatrix} \begin{bmatrix} P_{XR} \\ P_{YR} \\ 1 \end{bmatrix} \quad (1)$$

Thus, when the robot control system 12 sends the cell center position, e.g., (1, 1) to the image processing system 11 in accordance with the above-mentioned instruction VREAD, the image processing system 11 conducts a conversion of the position from the robot coordinate system to the visual coordinate system in accordance with the equation (1) mentioned above. Conversely, the exact work position recognized by the image processing system 11 in terms of the sensor coordinate system is converted into a position on the robot coordinate system in accordance with the following equation (2), and sent back to the robot control system 12.

$$\begin{bmatrix} P_{XR} \\ P_{YR} \\ 1 \end{bmatrix} = \begin{bmatrix} \cos\theta/k & -\sin\theta/k & -\delta_X \\ \sin\theta/k & \cos\theta/k & -\delta_Y \\ 0 & 0 & 1 \end{bmatrix} \begin{bmatrix} P_{XV} \\ P_{YV} \\ 1 \end{bmatrix} \quad (2)$$

Characteristic Parameters

FIG. 10 is a plan view of the work handled by the system shown in FIG. 1. This work is the same as that explained before in connection with FIGS. 4A and 4B.

As will be seen from FIG. 10, the work has a generally rectangular form and is provided with a cylindrical hole A at a central left portion and an oval hole B at a central right portion thereof. These holes A and B are adapted to receive the fixing pins 9a and 9b in the system shown in FIG. 1. The oval form of the hole B is adopted in consideration of a tolerance of the distance between the pins 9a and 9b.

In this embodiment, amounts derived from the images of these two holes are used as characteristic parameters which enable discrimination of the object work to be picked up. These amounts are:

| Area of the hole A | SA |
|---|---|
| Area of the hole B | SB |
| Distance between centroids of the holes A and B | L |
| Distance between centroid of hole A and the work centroid | l |
| Line passing through centroids of the holes A and B | α |

It is not always necessary that the centroid of the work be strictly the same as the physical centroid. In this embodiment, the bisector point between the centroids of the holes A and B is defined as the work centroid $(X_W, Y_W)$.

The above-described characteristic parameters are beforehand computed and stored in the memory 105. In operation, the characteristic parameters $S_A'$, $S_B'$ and $L'$ of the candidate image computed from the image of the work on the pallet are compared with the stored parameters SA, SB and L, and whether the object work is within the area covered by the image is determined on the basis of the result of the comparison.

Preparatory Process

FIG. 17A shows a preparatory process which is conducted through the CRT 205 and the keyboard 206 of the robot control system 12. The preparatory process is conducted mainly for the purpose of storing the position data shown in FIG. 8. FIG. 17B shows a preparatory process which is conducted through the CRT 106 and the keyboard 107 of the image processing system. This preparatory process is intended mainly for computing characteristic parameters and storing the computed parameters in the memory 105.

Referring to FIG. 17A, in Step S2, positions of the cells in the pallet 6 set in the state shown in FIG. 1 are input as the approximate work pick-up positions. In this operation, the position P at which the pallet image is taken and the pick-up position Q are input in a pair, for each of the pick-up position, as shown in FIGS. 8 and 11. In Step S4, a sequence for picking up works on the pallet is input. In Step S6, relationships between the cell positions and the types of the works in the cells are input. This operation is necessary when works of different types are placed on the pallet.

Referring now to FIG. 17B, the amount of deviation between the sensor coordinate system and the robot coordinate system, explained before in connection with FIG. 14, is computed in Step S10. The deviation can be expressed in terms of offsets $\delta_X$, $\delta_Y$ of origins of both coordinate systems in the X-Y plane and angle offset $\theta$ between the Z-axes of both coordinate systems. These values can easily be computed from an image of a reference work which is taken with the reference work placed under the camera 10 in normal posture with respect to the axes XR and YR Of the robot coordinate system. The reference work should have high precision in the X-and Y-directions.

Steps S12 to S18 are for computing and storing the characteristic parameters of a plurality of types of works. In Step S12, a work is placed immediately under the camera 10. In Step S14, the characteristic parameters of this work are computed. In Step S16, the computed parameters are stored in the memory 105 as the parameters peculiar to this work. If the works on the pallet are of the same type, the preparatory process with the image processing system 11 is completed. However, if a plurality of types of works exist, Steps S12 to S16 are repeatedly conducted.

Computation of Characteristic Parameters

A detailed description will be given of the method of computation of the characteristic parameters conducted in Step S14, with a specific reference to FIG. 18. The processes of the flow charts shown in these Figures are executed under the control of the microcomputer 100.

Figure 18:
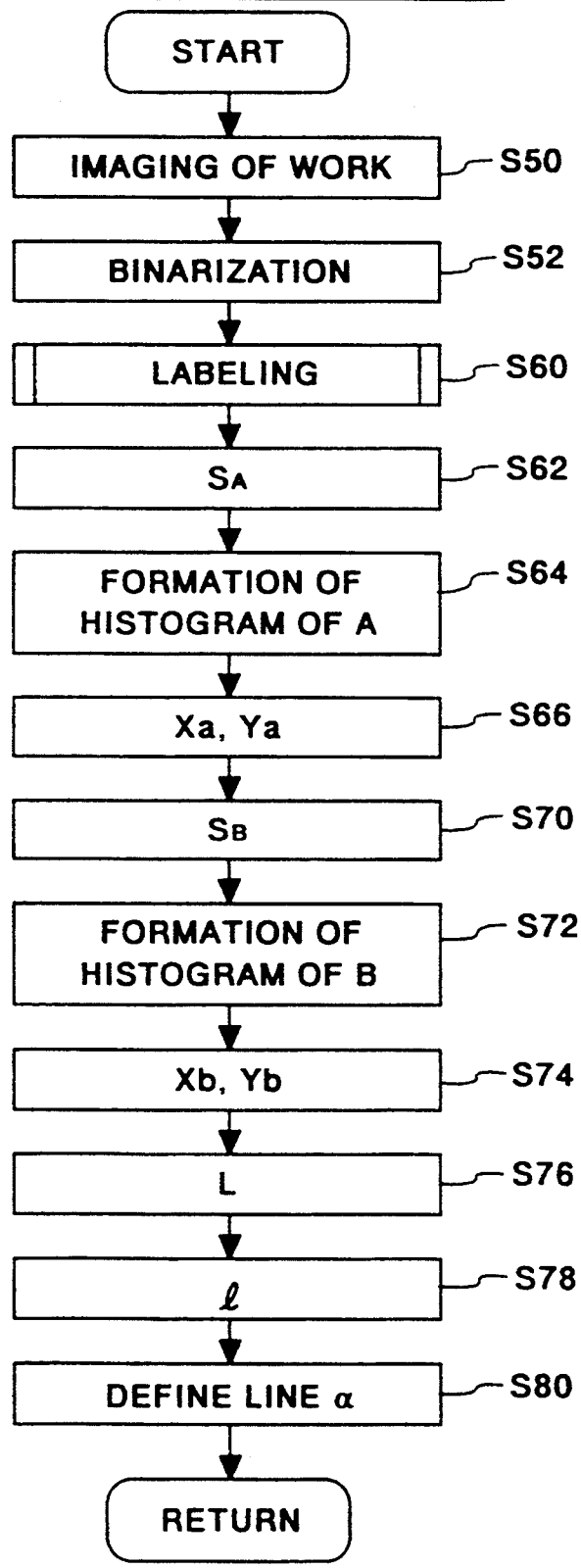
FIG. 18 is a flow chart illustrating a procedure for computing characteristic parameters in a preparatory process.

Referring to FIG. 18, in Step S50, the image of a work is taken by the CCD sensor of the camera 10 and is delivered through the A/D converter 108 to the frame memory 110 so as to be stored in this memory 110. Then, the image in the frame memory 110 is binarized at a predetermined threshold level. Steps S60 onwards conduct the computations of parameters SA, SB and so forth. In Step S60, labeling is conducted on the binarized image.

Figure 21:
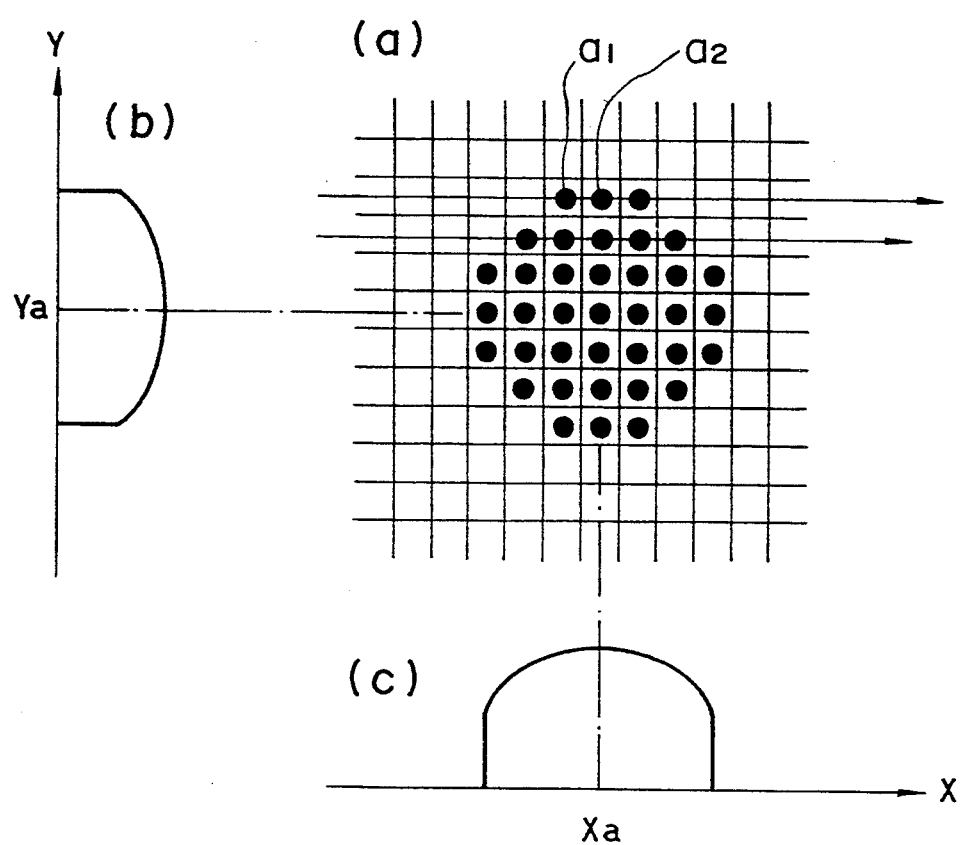
FIG. 21 is an illustration of a labeling process.

A detailed description will be given of the labeling process, with specific reference to FIG. 21. In general, the labeling is conducted as a preparatory step for a pattern recognition of binary image. The labeling, therefore, is conducted also in a step preceding a later-described operation of the robot for picking up the aimed image by the robot, on the image of the object work. The labeling conducted in Step S60 is intended for extracting the characteristic parameters of a known work, so that labeling is conducted on the images of the two holes A and B. In FIG. 21, however, only the hole A of the work is represented by a black dot, for the purpose of convenience in the explanation.

As the first step, a scanning on the content of the frame memory 110 is conducted in the direction of the X-axis of the sensor coordinate system to search for a black dot. The black dot searched out for the first time is determined as A1 and "a" is labeled to this dot. Then, whether or not the pixel A2 next to the pixel A1 is black is examined. If the pixel A2 is black, a region of a size 3×3 pixels (so-called 8 neighboring pixels) is set such that the pixel A2 is positioned at the center of this region. If a pixel labeled with "a" (pixel A1 in this case) is found in this region, the central pixel (pixel A2 in this case) of the region also is labeled with "a". This operation is repeated so that a block of continuous region is extracted as "a" If a plurality of continuous regions exist in the image, these regions are labeled as, for example, with "b", "c" and so forth. The detail of the labeling operation conducted in Step S60 has been described. This labeling operation can be conducted at a high speed by the hardware of the arithmetic unit 103. A similar arithmetic operation is also conducted for the hole B and a labeling is conducted and the hole B is detected as a continuous region and suitably labeled. The block of black dots corresponding to the hole A will be referred to as a "block a". Similarly, the block of black dots corresponding to the hole B will be termed as a "block b".

In Step S62, the area SA of the hole A is computed. The area can be computed by counting the number of the black dots in the block "a". In Step S64, histograms of the block "a" are computed both in the directions of X-axis and Y-axis. These histograms are shown in portions (b) and (c) of FIG. 21. Since the hole A is a circular hole, the coordinate value corresponding to the maximum value of the histogram in the Y-axis direction gives the X-axis coordinate value $X_A$ of the centroid of the hole A. Similarly, the coordinate value corresponding to the maximum value in the X-direction histogram provides the Y-axis coordinate value $Y_A$ of the centroid of the hole A. The procedure of Steps S62, S64 and S66 also are applied to the hole B labeled as "b". Thus, the area SB of the hole B and the coordinates $X_b$, $Y_b$ of the centroid of the hole B are computed in Steps S70 to S74. Step S76 computes the distance L between the centroids $(X_a, Y_a)$ and $(X_b, Y_b)$ of the holes A and B in accordance with the following equation:

$$L = \{(Xa-Xb)^2 + (Ya-Yb)^2\}^{\frac{1}{2}}$$

In Step S78, the factor 1 is set such that the point which is centered between the centroids (Xa, Ya) and (Xb, Yb) of the holes A and B coincides with the centroid of the work. Step S80 defines a line $\alpha$ (see FIG. 10) which connects the centroids of two holes A and B.

The parameters of the work are thus extracted and stored in the memory 105, and the preparatory process with the image processing system is now completed.

Control of Pick-up Operation

Left and right half-parts of FIG. 19 respectively show the controls performed by the robot control system 12 and the image processing system 11 when the robot continuously and repeatedly conducts operation for picking up object works and placing the same at designated positions. When picking up and placing of works of the same type are repeatedly conducted, a series of instructions including VREAD (1, n), VMOVE (1, n), VMOVE (1, n+1), ON 1, VMOVE (1, n) shown in FIG. 9 are repeatedly issued. The instruction VMOVE (1, n) represents an instruction for moving the robot hand 8 to the position P right above the aimed cell, while VMOVE (1, n+1) represents an instruction for moving the robot hand to the pick-up position Q. These program instructions are executed after conversion into macro-instructions by the control program 202. FIG. 19 shows these controls in conformity with the sequence of execution of the macro-instructions.

More specifically, in FIG. 19, Steps S20 to S24 correspond to the macro-instruction of VREAD (1, n). Namely, when n=1 in the cell position (1, n), the position coordinate data (300, 300, 0, 0) are read from the memory 203 in Step S20. In Step S22, the coordinate values of the cell are transmitted to the image processing system 11 through the communication control unit 209. The image processing system 11 receives the data through the communication control unit 111.

Upon receipt of the coordinate data, the image processing system 11 executes Step S42 in which the centroid position $(X_{WR}, Y_{WR})$ of the object work in terms of the robot coordinate system and the inclination $\phi$ of the object work with respect to the coordinate axes of the robot coordinate system are computed and sent to the robot control system 12 through the communication control unit 111. The computation of the position of the centroid of the object work conducted in Step S42 requires searching of a work image from the image covering the cell.

Steps S26 and S27 correspond to the instructions VMOVE (1, n) and VMOVE (1, n+1). More specifically, Step S26 determines whether or not an abnormally large difference exists between the work centroid position $(X_{WR}, Y_{WR})$ detected by the image processing system and the coordinate position which has been sent to the image processing system 11 in Step S20. This operation is necessary for the following reason. Although a work is freely set in each cell and can have various orientations with respect to the cell, a work does not come out of the cell in normal state. Therefore, if the difference between the work centroid position $(X_{WR}, Y_{WR})$ detected by the image processing system and the coordinate position which has been sent to the image processing system 11 in Step S20 is as large as the cell size, it is considered that the image processing system has wrongly recognized a work other than the object work. In such a case, the process proceeds to Step S32 to conduct a suitable error-routine such display, indication or notification of the error, tripping of the system or the like. When such an abnormal difference is not found, the process proceeds to Step S27 in which the robot arm is moved. Namely, the robot hand 8 is moved to the point P and then to the point Q as shown in FIG. 11.

Step S28 corresponds to the instruction ON 1. Namely, this step activates the sucking means on the hand 8 so as to pick up the work.

Step S30, which corresponds to the instruction VMOVE (1, n), retracts the hand 8 picking the work to the point P and then moves the hand to a predetermined position (assembly stage 9 shown in FIG. 9) where the hand places the work at the designated position.

Computation of the Position of Centroid of Object Work

Figure 20:
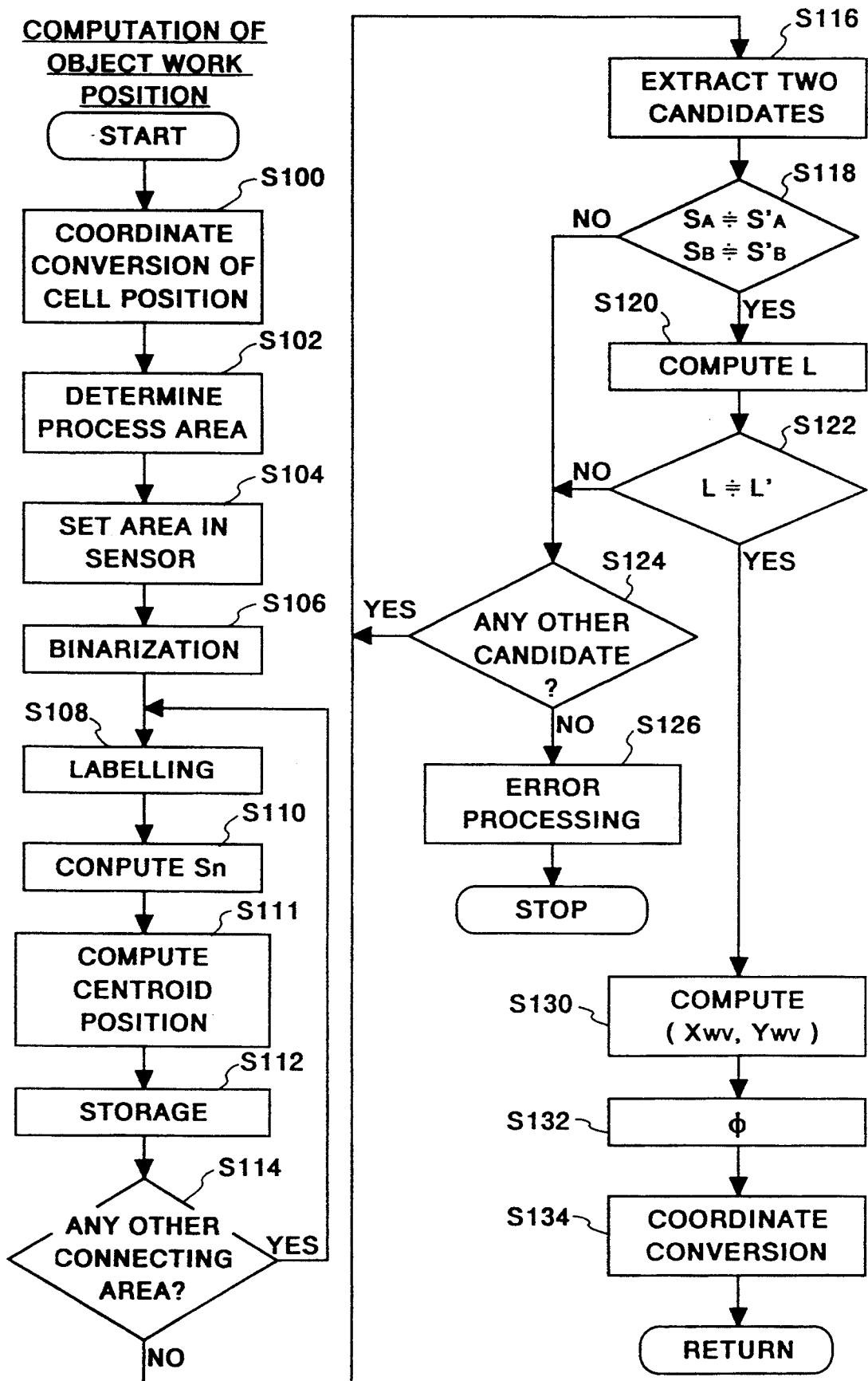
FIG. 20 is a flowchart of a process for detecting exact position for picking up an object work.

The routine for computing the centroid position of the object work on the robot coordinate system, which computation is executed in Step S 42, is shown in detail in FIG. 20.

Referring to FIG. 20, Step S100 converts the cell position (PXR, PYR, 1) received from the robot control system 12 into the coordinate values of the sensor coordinate system in accordance with the equation (1) mentioned before. In Step S102, a processing area PA for searching for the work image on the basis of the work position ($P_{XV}$, $P_{YV}$, 1) of the sensor coordinate system is determined.

Figure 15:
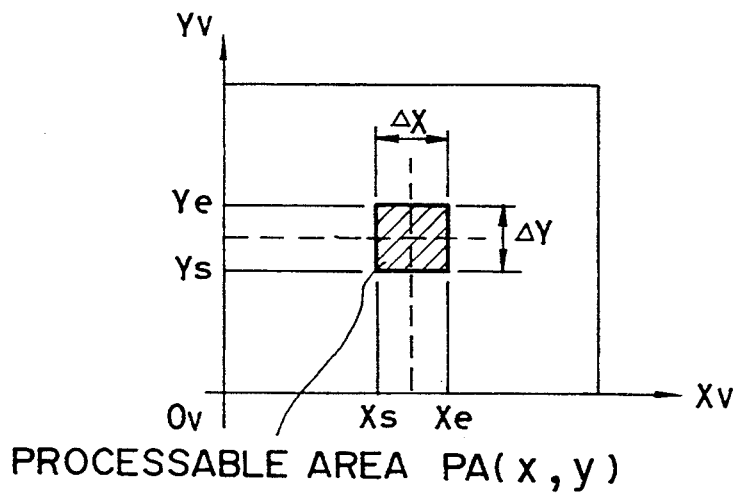
FIG. 15 is an illustration of a area PA over which an image processing operation is conducted in an image processing section.

FIG. 15 shows the field of vision of the CCD sensor of the camera 10. As will be seen from FIG. 15, this processing area PA has widths $\Delta x$ and $\Delta Y$.

More specifically, the processing area PA, which is defined by $Xs \leq Xv \leq Xe$ and $Ys \leq Yv \leq Ye$, is set to meet the following conditions:

$$X_S = P_{XV} - \Delta_X/2$$
$$X_e = P_{XV} + \Delta_X/2$$
$$Y_s = P_{YV} - \Delta_Y/2$$
$$Y_e = P_{YV} + \Delta_Y/2$$

Figure 16:
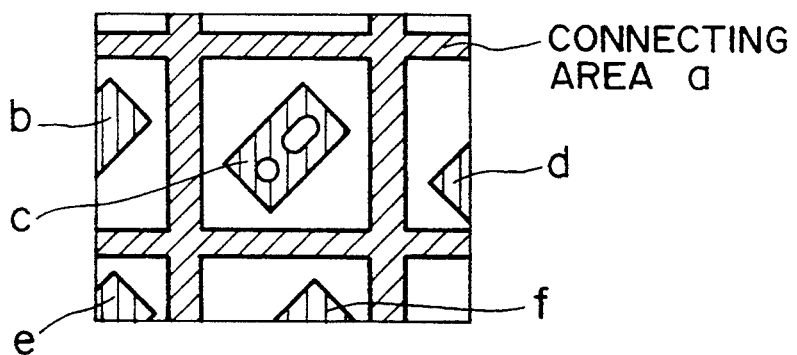
FIG. 16 is an illustration of an image of the image processing area PA.

It is necessary that the size of the processing area PA is greater than that of the cell. Information concerning the size and position of the processing area PA is sent to the camera 10. In Step S104, the camera sends to the frame memory only the portion of the image data included in the processing area PA. An example of image thus obtained in the frame memory 110 is shown in FIG. 16. It will be seen that continuous regions a to f of a constant density are included in the image. These continuous regions are images of the object work, pallet walls and portions of other works. In Step S106, the image data in the frame memory 110 is binarized.

Steps S108 to S114 are for labeling all the continuous regions in the processing area PA. More specifically, a continuous region An is detected in Step S108. The method of detecting continuous regions has been described in connection with FIG. 21. In Step S110, the area Sn of the continuous region is computed and the position of centroid of this region is detected in Step S111 in the manner explained before in connection with FIG. 21.

After labeling on all the continuous regions in the processing area PA, Steps S116 to S124 are executed to search for continuous regions corresponding to the holes A and B. More specifically, in Step S116, spontaneous two continuous regions are taken out and the area of the smaller region and the area of the greater region are respectively determined as SA' and SB'. In order to examine whether the two continuous regions selected on Step S118 are the images of the holes A and B in the work, an operation is conducted to determine whether the following conditions are met:

$$SA' \simeq Sa$$

$$SB' \simeq SB$$

SA and SB are the characteristic parameters which are beforehand stored in the memory 115. When these conditions are met in Step S118, the process proceeds to Step S120 in which the distance L' between the centroids of these two continuous regions is computed. The subsequent Step S122 determines whether the following condition is met:

$$L' \simeq L$$

where, L is the characteristic parameter stored beforehand in the memory 105. Satisfaction of the above-mentioned condition in Step S122 without doubt means that the image containing these two continuous regions corresponds to the object work. Then, Step S130 is executed in which the position which is centered between the centroids of these two regions is computed and determined as the position of the centroid of the object work.

Representing the positions of the centroids of these two continuous regions by (Xav, Yav) and (Xbv, Ybv), the distance L between these centfolds is given by the following equation:

$$L = \{(Xav - Xbv)^2 + (Yab - Ybv)^2\}^{\frac{1}{2}}$$

The suffix "v" is used to mean that the coordinate values such as Xa, Yb with such suffix are of the sensor or visual coordinate system.

The position (Xwv, Ywv) of the work centroid is therefore given as $$\left( X_{WAV} - \frac{L}{2}, Y_{WAV} - \frac{L}{2} \right).$$

Step S132 computes the angle $\phi$ formed between the line a interconnecting the holes A and B and the X-axis Xv of the sensor coordinate system (see FIG. 13). In Step S134, the position of the work centroid (Xwv, Ywv) is converted into the value (XWR, YWR) Of the robot coordinate system in accordance with the equation (2) mentioned before. In Step S44 shown in FIG. 19, the coordinate data (XWR, YWR) and the inclination $\nu + \phi$ of the work with respect to the axis XR of the robot coordinate system are delivered to the robot control system 12.

When the object work is not found after the examination of all the continuous regions in Step S124, the process proceeds to Step S126 to execute the error-processing.

Advantages of the Embodiment

In the embodiment as described, it is possible to sequentially and correctly pick up and mount all of works arranged on a pallet with the aid of a visual sensor, simply by teaching the robot the rough positions of the works on the pallet and the progress of the pick-up operation. It is also possible to give a pallet exchanging demand to the operator or a pallet supply section of the system when the pallet has become empty.

Furthermore, the visual sensor is relieved from the job for administrating the works on the pallet. Namely, the visual sensor is required only to measure the exact position of a work appointed by the robot. Therefore, the processing time is not substantially prolonged and, hence, the assembly of the object with the works can be conducted at high speed.

The described embodiment also has a function for converting position data on the robot coordinate system to the position data on the sensor coordinate system and vice versa, so that the robot control system 12 can compare the work pick-up position data which has been sent therefrom to the image processing system 11 with the measured pick-up position data sent back thereto from the sensor coordinate system, whereby any mis-recognition by the image processing system can be detected without fail.

Modification

The described embodiment is only illustrative and various changes and modifications may be imparted thereto without departing from the scope of the present invention.

For instance, although in the described embodiment the works are arranged on the pallet in a matrix form, it is not always necessary that the matrix are arranged in a matrix form. For instance, the works may be arranged in, for example, a row, or may be arranged in a random form on the pallet. What is required is that the positions of the works on the pallet have been roughly determined and that such rough work positions are taught to the robot.

A modification will be described with reference to FIG. 22. As explained before, the camera 10 used in the embodiment shown in FIG. 1 has a CCD sensor which has a field of vision composed of 400,000 pixels. This CCD sensor has a coverage large enough to take image of the entire area of the pallet at once. If the pallet has a large area and if it is not allowed to reduce the resolution of the sensor, it is necessary that the CCD sensor has a correspondingly large size, with the result that the cost of the apparatus is raised. The modification shown in FIG. 22 allows the use of a CCD sensor having a reduced size. Namely, this modification has an X- direction actuator and a Y-direction actuator which are capable of moving the sensor two-dimensionally along the focal plane of the camera 10 to the processing area PA which is set in Step S102 mentioned before.

In the embodiment shown in FIG. 1, the cell has a constant size and only one type of work is handled. The invention, however, can be applied also to a case where cells of different sizes are provided on a pallet and also to a case where different types of works exist on a pallet. In such cases, information concerning the relationship between the position and size of the cells and the types of the works of these cells is sent from the robot control system 12 to the image processing apparatus 11. The invention also is applicable to a case where a plurality of works exist in a single cell.

In the embodiment shown in FIG. 1, a combined instructions composed of VREAD and VMOVE is used for enabling pick-up of a work. This is because the robot control system 12 and the image processing system 11 are provided as separate systems which operate independently. This, however, is not exclusive and the robot control system and the image processing system 11 of the present invention may be integrated with each other so that the operation for picking up a work can be described by a single instruction.

It is also to be understood that the conversion from the robot coordinate system to the sensor coordinate system and vice versa, employed in the described embodiment, may be omitted if the apparatus is constructed such that the robot coordinate system and the sensor coordinate system strictly coincide with each other.

Although in the described embodiment the facility for the coordinate conversion belongs to the image processing system, this is only illustrative and the coordinate conversion may be effected in the robot control system.

In the described embodiments the positions where the values of histograms are maximized are determined as the centroid positions of the holes A and B, as explained in connection with FIG. 21. This method, however, is only illustrative and the position of the centroid may be determined as the position of the pixel the integration of frequency of appearance of which amounts to n/2, representing the number of the pixels or dots in the block by n. This method enables determination of the centroid position even when the hole under examination has a shape which does not conform with the expected shape of the hole.

The present invention is not limited to the above embodiments and various changes and modifications can be made within the spirit and scope of the present invention. Therefore, to apprise the public of the scope of the present invention the following claims are made.

What is claimed is:

1. A work pick-up apparatus which picks up an object work out of a plurality of works accommodated in units of a container case having a plurality of cells, each cell having a predetermined size and a predetermined location expressed in a coordinate system associated with said work pick-up apparatus, said work pick-up apparatus comprising:

visual sensor means for obtaining an image of said case;

memory means for storing shape characteristic information representative of the shape characteristics of said object work;

input means for inputting work position information representing a position of an object work to be picked up within said case, said work position information being expressed in terms of the coordinate system associated with said work pick-up apparatus; and measuring means for determining a position of said work to be picked up in terms of said coordinate system associated with said pick-up apparatus, said measuring means comprising:

first conversion means for converting the work position information expressed in the coordinate system associated with the apparatus into a work position expressed in terms of a coordinate system associated with said visual sensor means;

area setting means for setting an image area around the work position expressed in terms of the coordinate system associated with said visual sensor means, and for obtaining image information of the set image area, the image area being selected as incrementally larger than the size of the work accommodating unit of said container case;

processing means for subjecting an obtained work image to pattern recognition processing, and for searching an image having shape characteristics similar to those of an image of said object work from a processed image, the search being performed using shape characteristics of the work stored in the memory means;

computing means for computing a position of a searched image; and second conversion means for converting said position of said searched image expressed in terms of the coordinate system associated with said visual sensor means into a coordinate position expressed in terms of the coordinate system associated with the apparatus.

2. A work pick-up apparatus according to claim 1, wherein said computing means computes a position of a centroid of the searched image in terms of the coordinate system associated with the visual sensor means.

3. A work pick-up apparatus according to claim 1, wherein said visual sensor means is placed in a focal region of a camera fixed to said apparatus and has a field of vision which substantially covers the entire area of said container case, said area setting means further includes:

means for selecting, based on image information representative of the entire area of said container case, an area of a size being larger than the size of the work accommodating unit of said container case.

4. A work pick-up apparatus according to claim 1, wherein said plurality of works are arranged in said container case at arbitrary positions around said cell.

5. A work pick-up apparatus according to claim 1, wherein said visual sensor means has a visual sensor which is disposed in a focal region of a camera fixed to said apparatus and has a field of vision which covers area of a size incrementally larger than that of the work accommodating unit of said container case, and wherein said area setting means further includes:

means responsive to the first conversion means for moving said visual sensor to the converted work position.

6. A work pick-up apparatus according to claim 1, further comprising:

(a) a first control circuit for executing a work pick-up sequence;

(b) a second control circuit for performing an image processing control;

(c) a communication circuit for enabling data communication between said first and second control circuits, wherein said first control circuit includes:

(a1) an input circuit serving as said input means for inputting said work, position as a work pick-up instruction; and (a2) a circuit for receiving, through said communication circuit, said coordinate position of said object work in terms of the coordinate system associated with said apparatus as determined by said measuring means; and wherein said second control circuit includes:

(b1) a circuit for receiving, through said communication circuit, said work pick-up instruction from said input circuit and for converting said work pick-up instruction into a coordinate position on a sensor coordinate system associated with said visual sensor;

(b2) a reading circuit for reading an image of a portion of said container case around said coordinate position on said sensor coordinate system; and (b3) a circuit for searching an image having shape characteristics similar to those of an object work within the read image, for computing the position of the centroid of the searched image, and for converting said position of said centroid into a coordinate position on said coordinate system associated with said apparatus.

7. A work pick-up apparatus according to claim 1, further comprising:

means for comparing said work position information input through said input means with a coordinate position of said object work determined by said measuring means; and means for producing an error signal when said work position information and said coordinate position determined by said measuring means largely differ from each other.

8. A work pick-up apparatus according to claim 1, wherein said works are provided with characteristic recesses in their surfaces for identification of said works, said container case has cells for receiving respective works, said cells being sized to allow said works to move therein.

* * * * *

UNITED STATES PATENT AND TRADEMARK OFFICE
CERTIFICATE OF CORRECTION

PATENT NO.  : 5,350,269
DATED       : September 27, 1994
INVENTOR(S) : YUSAKU AZUMA ET AL.                    Page 1 of 5

It is certified that error appears in the above-identified patent and that said Letters Patent is hereby corrected as shown below:

Title page:

Item: [56] REFERENCES CITED

U.S. Patent Documents,
"Kirssch et al." should read --Kirsch et al.--.

Foreign Patent Documents,
" 2102240  1/1983  European Pat. Off.
 20255949  2/1988  European Pat. Off."
should read
--2102240  1/1983  United Kingdom
   255949  2/1988  European Pat. Off.--.

Other Publications, Under Page et al.,
"Automatic" should read --Automation--.

SHEET 13 OF 15

FIG. 20, "CONPUTE Sn" should read --COMPUTE Sn--.

COLUMN 1

Line 36, "of the" should be deleted.

COLUMN 2

Line 7, "recognize" should read --to recognize--.

UNITED STATES PATENT AND TRADEMARK OFFICE
CERTIFICATE OF CORRECTION

PATENT NO. : 5,350,269
DATED : September 27, 1994
INVENTOR(S) : YUSAKU AZUMA ET AL.

It is certified that error appears in the above-identified patent and that said Letters Patent is hereby corrected as shown below:

COLUMN 3

Line 28, "0" should be deleted.
Line 38, "prior" should read --the prior--.
Line 63, "5" should be deleted.
Line 65, "pick-up" should read --pick up--.

COLUMN 4

Line 7, "a" should read --an--.
Line 43, "certain" should read --a certain--.
Line 54, "15" should be deleted.
Line 63, "pick-up" should read --pick up--.
Line 64, "conveys" should read --convey--.
Line 67, "product. In" should read --product. ¶ In--.

COLUMN 6

Line 50, "informs" should read --sends--.
Line 59, "informed" should read --sent--.

COLUMN 7

Line 3, "sensor 10." should read --camera 10.--.
Line 11, "root" should read --robot--.

UNITED STATES PATENT AND TRADEMARK OFFICE
CERTIFICATE OF CORRECTION

PATENT NO. : 5,350,269
DATED : September 27, 1994
INVENTOR(S) : YUSAKU AZUMA ET AL.

It is certified that error appears in the above-identified patent and that said Letters Patent is hereby corrected as shown below:

COLUMN 8

Line 40, "$\delta_Y$" should read -- $-\delta_Y$ --.

Line 59, "$\begin{bmatrix} -\delta X \\ -\delta Y \\ 1 \end{bmatrix}$" should read -- $\begin{bmatrix} -\delta X \\ -\delta Y \\ 1 \end{bmatrix}$ --.

COLUMN 9

Line 52, "position," should read --positions,--.
Line 68, "Of" should read --of--.

COLUMN 10

Line 2, "X-and" should read --X- and --.

COLUMN 11

Line 11, "value $X_A$" should read --value $X_a$--.
Line 14, "value $Y_A$" should read --value $Y_a$--.

COLUMN 12

Line 23, "such" should read --such as--.
Line 34, "picking" should read --picking up--.
Line 44, "Step S 42," should read --Step S42,--.
Line 56, "$\Delta x$" should read --$\Delta X$--.
Line 61, "$X_s$" should read --$X_s$--.
Line 67, "5" should be deleted.

UNITED STATES PATENT AND TRADEMARK OFFICE
CERTIFICATE OF CORRECTION

PATENT NO. : 5,350,269
DATED : September 27, 1994
INVENTOR(S) : YUSAKU AZUMA ET AL.

It is certified that error appears in the above-identified patent and that said Letters Patent is hereby corrected as shown below:

COLUMN 13

Line 33, "SA'=Sa" should read --SA'=SA--.
Line 38, "memory 115." should read --memory 105.--.
Line 59, "centfolds" should read --centroids--.

COLUMN 14

Line 10, "Of" should read --of--.
Line 14, "$\upsilon+\phi$" should read --$\theta+\phi$--.
Line 56, "the matrix" should read --the works--.

COLUMN 15

Line 24, "instructions" should read --instruction--.

COLUMN 16

Line 55, "case," should read --case, and--.
Line 63, "cell." should read --cells.--.

UNITED STATES PATENT AND TRADEMARK OFFICE
CERTIFICATE OF CORRECTION

PATENT NO. : 5,350,269
DATED : September 27, 1994
INVENTOR(S) : YUSAKU AZUMA ET AL.

It is certified that error appears in the above-identified patent and that said Letters Patent is hereby corrected as shown below:

<u>COLUMN 17</u>

Line 12, "control;" should read --control; and--.
    Line 17, "work, position" should read --work position--.
    Line 24, "means; and" should read --means; and ¶ --.

Signed and Sealed this

Eighteenth Day of April, 1995

BRUCE LEHMAN

*Attest:*

*Attesting Officer*

*Commissioner of Patents and Trademarks*